United States Patent
Xu et al.

(10) Patent No.: US 11,338,614 B2
(45) Date of Patent: *May 24, 2022

(54) WHEEL AND RIM WITH WEIGHT REDUCTION SOCKETS

(71) Applicant: CITIC Dicastal CO., LTD., Hebei (CN)

(72) Inventors: Zuo Xu, Qinhuangdao (CN); Xu Wang, Qinhuangdao (CN); Hanqi Wu, Qinhuangdao (CN); Zhen Li, Qinhuangdao (CN); Kaiqing Wang, Qinhuangdao (CN); Yule Zhou, Qinhuangdao (CN); Chuan Cheng, Qinhuangdao (CN); Changhai Li, Qinhuangdao (CN); Tiefeng Hu, Qinhuangdao (CN); Hui Chi, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 302 days.

This patent is subject to a terminal disclaimer.

(21) Appl. No.: 16/202,245

(22) Filed: Nov. 28, 2018

(65) Prior Publication Data
US 2019/0270337 A1 Sep. 5, 2019

(30) Foreign Application Priority Data
Mar. 5, 2018 (CN) .......................... 201820298493.5

(51) Int. Cl.
*B60B 21/02* (2006.01)
*B60B 3/10* (2006.01)

(52) U.S. Cl.
CPC .............. *B60B 21/026* (2013.01); *B60B 3/10* (2013.01); *B60B 2360/104* (2013.01); *B60B 2900/111* (2013.01)

(58) Field of Classification Search
CPC .... B60B 3/10; B60B 21/026; B60B 2900/111
See application file for complete search history.

(56) References Cited

U.S. PATENT DOCUMENTS

| 5,826,949 A * | 10/1998 | Bortoloni ................ B60B 3/06 301/95.107 |
| 6,983,901 B2 * | 1/2006 | Bitton .................... C22B 7/005 241/24.14 |
| 2006/0017316 A1 * | 1/2006 | Rodrigues ............. B60B 21/026 301/95.101 |

(Continued)

FOREIGN PATENT DOCUMENTS

JP H11192804 A * 7/1999 ............. Y02T 10/86

*Primary Examiner* — Jason R Bellinger
*Assistant Examiner* — Emily G Castonguay
(74) *Attorney, Agent, or Firm* — Cooper Legal Group, LLC

(57) ABSTRACT

A wheel and a rim with weight reduction sockets are provided. The rim is made of an aluminum alloy and includes an inner flange, a middle portion and an outer flange, the inner flange, middle portion and outer flange are all annular and are connected end to end to form a cylindrical rim, in which weight reduction sockets are provided on the outer surface of the middle portion of the rim; the weight reduction sockets are rectangular ones, and are arranged in lattices in turn; and 3-5 rows of weight reduction sockets are arranged annularly on the outer surface of the middle portion of the rim.

12 Claims, 4 Drawing Sheets

(56) References Cited

U.S. PATENT DOCUMENTS

2012/0286562 A1* 11/2012 Ono .................... B60B 21/026
  301/95.101
2018/0319208 A1* 11/2018 Seung .................. B60B 21/026

* cited by examiner

WHEEL AND RIM WITH WEIGHT REDUCTION SOCKETS

CROSS-REFERENCE TO RELATED APPLICATION

The present application claims benefit of Chinese Patent Application No. 201820298493.5, filed on Mar. 5, 2018, the contents of which are hereby incorporated by reference in its entirety.

BACKGROUND

As natural resources shrink, the direction of development of modern automobile industry technology is to further reduce the weight of automobiles, reduce the consumption of fuels and reduce the emission of exhaust.

Aluminum alloy hubs have won the favor of more and more private car owners by attractive appearance, safety, comfort and other characteristics. The lightweight design of the rim of the aluminum alloy hub is to optimize the design of the rim structure under the predetermined use environment and load condition, thereby reducing the weight of the hub and meeting the reliability and basic performance of the hub.

Thus, it has been desirable in the art to balance the weight reduction and the mechanical strength by reducing the weight of the hub as much as possible on the premise that the strength of the aluminum alloy hub is ensured by a specific outer rim weight reduction design.

SUMMARY

The disclosure relates to the technical field of automobile parts, and specifically, relates to a weight reduction solution for an aluminum alloy hub having quadrangular weight reduction sockets on the outer side of its rim.

The object of the disclosure is to provide a weight reduction solution for a hub having weight reduction sockets on the outer side of its rim.

Unless otherwise stated, in the disclosure, "wheel" and "hub" are intended to express the same meaning, i.e., a wheel ring made of an aluminum alloy, including a wheel disc and a rim. The wheel disc and the rim may be combined by bolts, welding, snapping or other method, or integrally formed.

Unless otherwise stated, the wheel and the rim of the disclosure are made of an aluminum alloy, specifically, are casted with A356.2 aluminum alloy.

In one aspect of the disclosure, provided is a rim with weight reduction sockets, the rim being made of an aluminum alloy and including an inner flange, a middle portion and an outer flange, the inner flange, middle portion and outer flange are all annular and are connected end to end to form a cylindrical rim, in which weight reduction sockets are provided on the outer surface of the middle portion of the rim; the weight reduction sockets are rectangular ones, and are arranged in lattices in turn; and 3-5 rows of weight reduction sockets are arranged annularly on the outer surface of the middle portion of the rim.

In a preferred aspect of the disclosure, the weight reduction sockets have a length of 10-40 mm, a width of 10-40 mm, and a depth of 0.5-3 mm.

In a preferred aspect of the disclosure, weight reduction socket reinforcing ribs are defined between the adjacent weight reduction sockets, and the weight reduction socket reinforcing ribs have a width of 3-10 mm.

In a preferred aspect of the disclosure, 4 rows of weight reduction sockets are arranged annularly on the middle portion of the rim, and the rectangles of the weight reduction sockets have a length of 32 mm, a width of 25 mm, and a depth of 2.5 mm.

In a preferred aspect of the disclosure, edge reinforcing ribs are provided at the edge of the middle portion of the rim, and extend out between the weight reduction sockets.

In a preferred aspect of the disclosure, the middle portion of the rim further includes side form joint ridges, and the side form joint ridges are located on the outer side of the middle portion of the rim and are perpendicular to a wheel disc of a wheel.

In a preferred aspect of the disclosure, 4-6 side form joint ridges are uniformly distributed on the circumference of the rim, and have a width of 8-14 mm and a height of 1-3 mm.

In a preferred aspect of the disclosure, the rim is made of A356.2 aluminum alloy.

In another aspect of the disclosure, further provided is a wheel having the above rim.

The weight of the hub is reduced by designing the weight reduction sockets in a specific shape for the outer side of the rim of the hub and selecting the size of the weight reduction sockets. In addition, the hub after weight reduction still has excellent mechanical properties, meets American Wheel Standards of SAE J175 and SAE J328-2005, namely meets the performance requirements for 13-degree impact strength, 90-degree impact strength, radial impact, radial fatigue and bending fatigue, and also meets the requirements of GB/T 5334-2005 and GB/T 15704-1995 for wheel strengths and fatigues.

BRIEF DESCRIPTION OF DRAWINGS

The embodiments of the disclosure will be described in detail below in combination with the accompanying drawings, in which.

LIST OF REFERENCE SYMBOLS

11—rim, 12—flange plate, 13—spoke, 21—weight reduction socket, 22—weight reduction socket reinforcing rib, 23—edge reinforcing rib, 31—side form joint ridge.

DETAILED DESCRIPTION

First Embodiment

Figure 1:
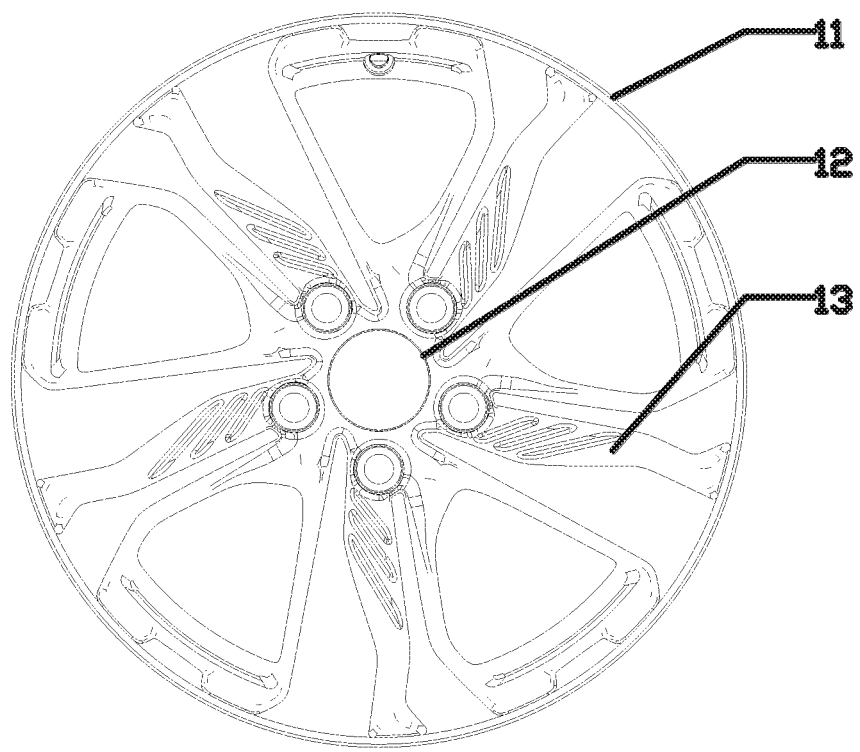
FIG. 1 is a schematic diagram of a front structure of a hub according to first embodiment of the disclosure.
Figure 2:
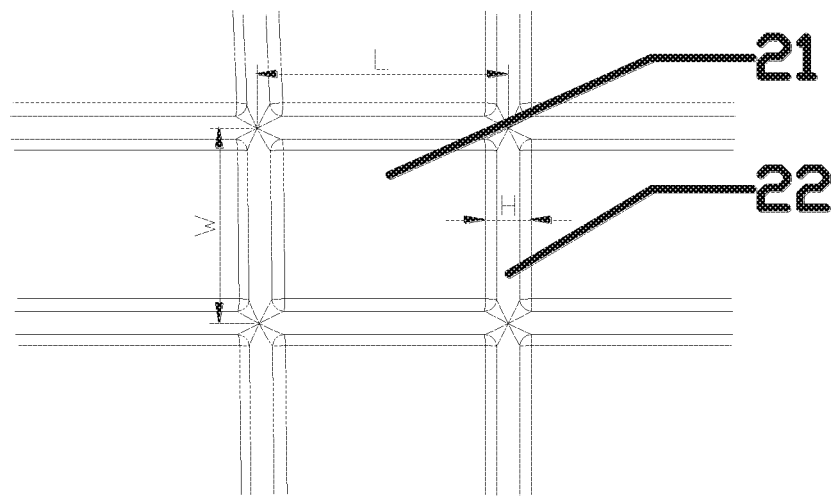
FIG. 2 is a schematic diagram of a weight reduction socket unit on the outer side of a rim of the hub according to first embodiment of the disclosure.
Figure 3:
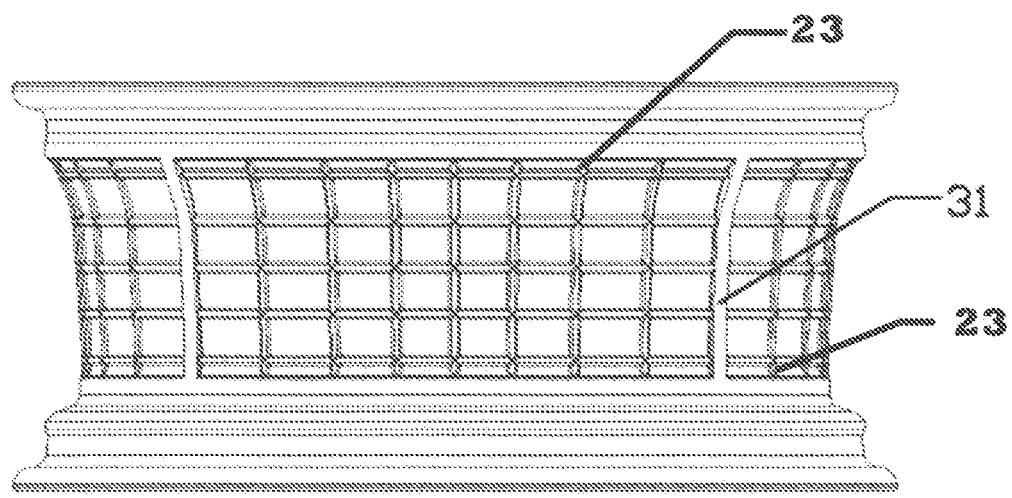
FIG. 3 is a schematic diagram of a weight reduction socket array on the outer side of the rim of the hub according to first embodiment of the disclosure.
Figure 4:
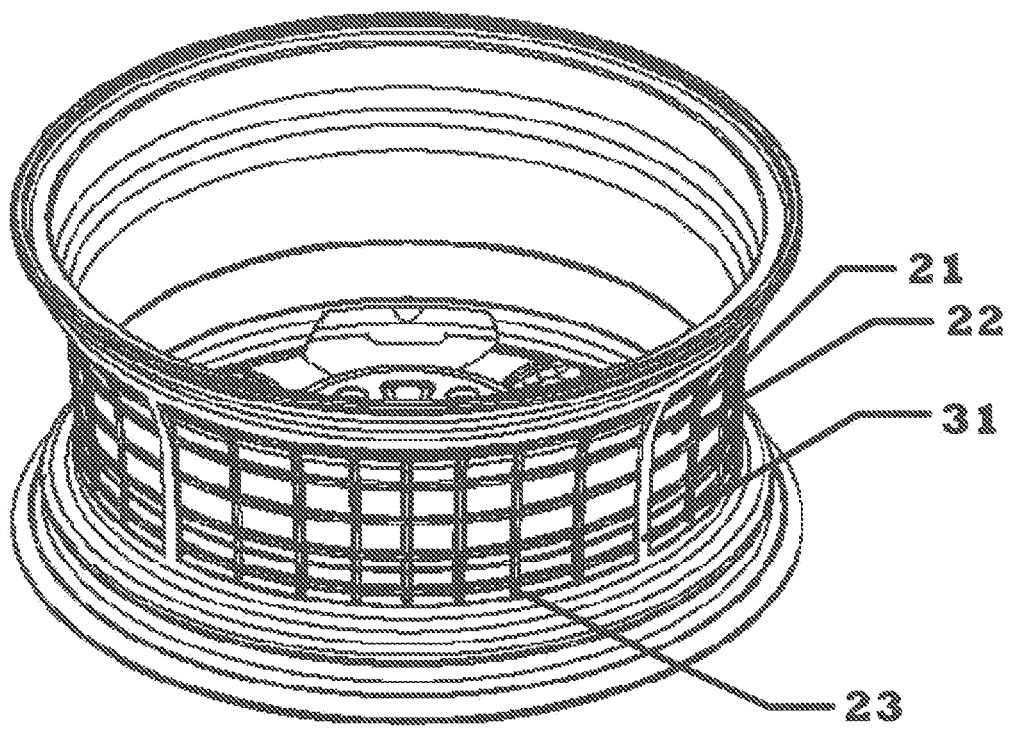
FIG. 4 is a three-dimensional structure diagram of the hub according to first embodiment of the disclosure.

The present embodiment provides a motor vehicle aluminum alloy hub having weight reduction sockets on the outer side of its rim. The hub includes a wheel disc and a rim 11, and the wheel disc includes a flange plate 12, a flange plate periphery portion and spokes 13. Weight reducing sockets 21 are provided on the outer side of the rim of the hub, the weight reduction socket unit 21 on the outer side of the rim is quadrangular, the quadrangle has a length of 32 mm and a width of 25 mm, and the weight reduction sockets have a depth of 2.5 mm, internal fillets of R2 and a rib width of 5 mm; and four side form joint ridges 31 of 10 mm are provided with a height of 3 mm, and the weight reduction socket array as shown in FIG. 3. By test, the weight of the hub is 11.29 kg in the absence of weight reduction sockets and is reduced by 1 kg in the presence of weight reduction sockets, and the weight reduction effect is about 8.9%.

Second Embodiment

Various properties of the motor vehicle hub of first embodiment were tested. The strengths and fatigues, including 13-degree impact strength, 90-degree impact strength, radial impact, radial fatigue, bending fatigue and the like, of the above wheel were tested in the test center of Dicastal. The tests show that the hub meets American Wheel Standards of SAE J175 and SAE J328-2005, namely meets the performance requirements for 13-degree impact strength, radial fatigue and bending fatigue, and also meets the requirements of GB/T 5334-2005 and GB/T 15704-1995 for wheel strengths and fatigues.

The invention claimed is:

1. A rim with weight reduction sockets, the rim being made of an aluminum alloy and comprising an inner flange, a middle portion and an outer flange, the inner flange, the middle portion and the outer flange are all annular and are connected end to end to form a cylindrical rim, wherein the weight reduction sockets are provided on an-outer surface of the middle portion of the rim; the weight reduction sockets are rectangular shaped, and are arranged in lattices; and 3-5 rows of the weight reduction sockets are arranged annularly on the outer surface of the middle portion of the rim, wherein weight reduction socket reinforcing ribs projecting radially are defined between adjacent weight reduction sockets of the weight reduction sockets, the weight reduction socket reinforcing ribs are arranged in lattices, and each of the weight reduction socket reinforcing ribs has a width of 3-10 mm, and wherein the middle portion of the rim further comprises a plurality of side form joint ridges which are parallel with each other, and the side form joint ridges are located on an outer side of the middle portion of the rim and are perpendicular to a wheel disc of a wheel, and wherein each of the side form joint ridges has a width which is greater than the width of each of the weight reduction socket reinforcing ribs.

2. The rim with weight reduction sockets according to claim 1, wherein each of the weight reduction sockets has a length of 10-40 mm, a width of 10-40 mm, and a depth of 0.5-3 mm.

3. The rim with weight reduction sockets according to claim 1, wherein 4 rows of the weight reduction sockets are arranged annularly on the outer surface of the middle portion of the rim, and each of the weight reduction sockets has a length of 32 mm, a width of 25 mm, and a depth of 2.5 mm.

4. The rim with weight reduction sockets according to claim 1, wherein edge reinforcing ribs are provided at edges of the middle portion of the rim, and extend axially between and out of the weight reduction sockets adjacent to the edges.

5. The rim with weight reduction sockets according to claim 1, wherein 4-6 of the side form joint ridges are uniformly distributed on a circumference of the rim, and each of the 4-6 side form joint ridges has a width of 8-14 mm and a height of 1-3 mm.

6. The rim with weight reduction sockets according to claim 1, wherein the rim is made of A356.2 aluminum alloy.

7. An aluminum alloy wheel comprising a rim with weight reduction sockets, the rim being made of an aluminum alloy and comprising an inner flange, a middle portion and an outer flange, the inner flange, the middle portion and the outer flange are all annular and are connected end to end to form a cylindrical rim, wherein the weight reduction sockets are provided on an outer surface of the middle portion of the rim; the weight reduction sockets are rectangular shaped, and are arranged in lattices; and 3-5 rows of the weight reduction sockets are arranged annularly on the outer surface of the middle portion of the rim, wherein weight reduction socket reinforcing ribs projecting radially are defined between adjacent weight reduction sockets of the weight reduction sockets, the weight reduction socket reinforcing ribs are arranged in lattices, and each of the weight reduction socket reinforcing ribs has a width of 3-10 mm, and wherein the middle portion of the rim further comprises a plurality of side form joint ridges which are parallel with each other, and the side form joint ridges are located on an outer side of the middle portion of the rim and are perpendicular to a wheel disc of the aluminum alloy wheel, and wherein each of the side form joint ridges has a width which is greater than the width of each of the weight reduction socket reinforcing ribs.

8. The aluminum alloy wheel according to claim 7, wherein each of the weight reduction sockets has a length of 10-40 mm, a width of 10-40 mm, and a depth of 0.5-3 mm.

9. The aluminum alloy wheel according to claim 7, wherein 4 rows of the weight reduction sockets are arranged annularly on the outer surface of the middle portion of the rim, and each of the weight reduction sockets has a length of 32 mm, a width of 25 mm, and a depth of 2.5 mm.

10. The aluminum alloy wheel according to claim 7, wherein edge reinforcing ribs are provided at edges of the middle portion of the rim, and extend axially between and out of the weight reduction sockets adjacent to the edges.

11. The aluminum alloy wheel according to claim 7, wherein 4-6 of the side form joint ridges are uniformly distributed on a circumference of the rim, and each of the 4-6 side form joint ridges has a width of 8-14 mm and a height of 1-3 mm.

12. The aluminum alloy wheel according to claim 7, wherein the rim is made of A356.2 aluminum alloy.

* * * * *